Oct. 19, 1971  C. C. FURTAW  3,613,338

LAWN MOWER HANDLE MOUNTING ASSEMBLY

Filed Oct. 1, 1969

INVENTOR

CLAYTON C. FURTAW

BY *Edward D. Murphy*

ATTORNEY

United States Patent Office 3,613,338
Patented Oct. 19, 1971

3,613,338
LAWN MOWER HANDLE MOUNTING ASSEMBLY
Clayton C. Furtaw, Baltimore, Md., assignor to The Black and Decker Manufacturing Company, Towson, Md.
Filed Oct. 1, 1969, Ser. No. 862,698
Int. Cl. A01d *35/26*
U.S. Cl. 56—10.1
7 Claims

ABSTRACT OF THE DISCLOSURE

The handle of an electric mower is insulated from the housing of the mower by dielectric members which are located entirely on an upper surface of the housing. Specifically, dielectric insulators are provided which isolate the handle mounting brackets from the housing and from the mounting bolts which extend through to the under surface of the housing.

---

This invention relates to electric lawn mowers and specifically to means for increasing the safety of operation of a lawn mower.

In the use of electric lawn mowers powered by means of an extension cord connected to a 115 v. AC line, operators sometimes run the mower over the cord and cut it. It is possible that the severed end of the cord, with an exposed live wire, may contact the housing of the mower although such contact is usually momentary. Since the operator is customarily holding a metal handle with bare hands, it is desirable that the handle be insulated from the housing.

This may be attempted by means of insulators under the deck which electrically isolate the handle, its mounting bracket and mounting bolts from the housing of the mower. The present invention is directed to the discovery that this solution to the problem is not adequate in that it is subject to failure during use and to a means for providing improved insulation of the handle.

Accordingly, it is an object of this invention to provide means for insulating the handle from the housing of an electric lawn mower.

It is also an object of this invention to provide such insulating means which will remain effective during use of the mower.

Briefly, in accord with a specific embodiment of this invention, the handle of an electric mower is insulated from the housing of the mower by dielectric members which are located entirely on an upper surface of the housing. Specifically, dielectric insulators are provided which isolate the handle mounting brackets from the housing and from the mounting bolts which extend through to the under surface of the housing.

The novel features believed characteristic of the invention are set forth in the appended claims. The invention itself, together with further objects and advantages thereof, can best be understood by a consideration of the following description and appended drawing in which:

Figure 1:
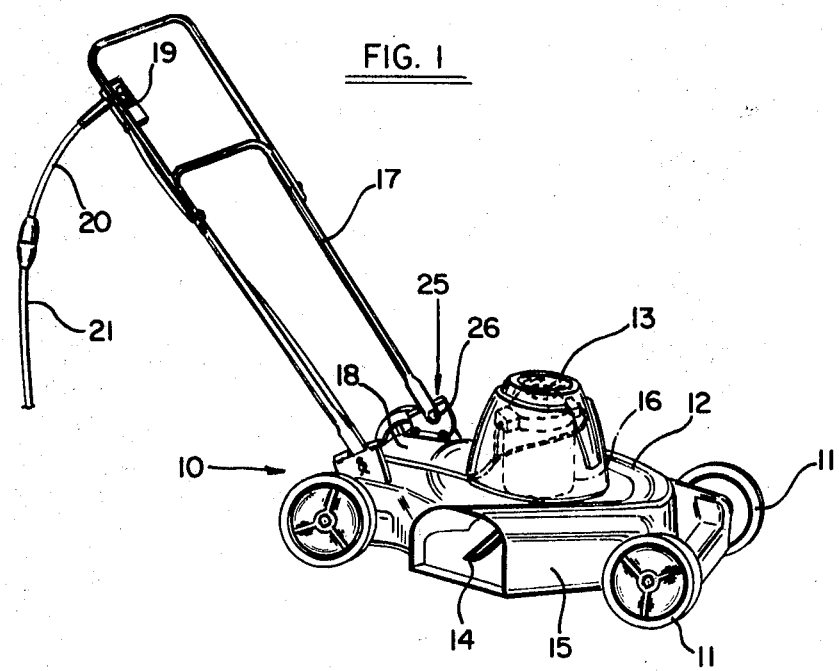
FIG. 1 is a perspective view of a lawn mower in accord with this invention.

FIG. 1, an illustrative mower 10 includes a plurality of wheels 11 carrying a housing which comprises a deck 12 and a shroud 13. The deck 12 encloses a blade 14, visible through the grass chute 15, and the shroud 13 covers an electric motor 16. A handle 17 is provided and a cable 18 extends from the motor to an ON-OFF switch 19 and then, via a cord 20, to an extension cord 21. The cord 21 is normally kept between the point where it is plugged in and the mower so that, as the operator mows away from the plug, the cord is not likely to be caught in the blade; to facilitate this operation, a cord control lever (not shown) may be provided.

In the course of using such mowers, however, some operators become careless and sever the cord. Although it is not a frequent occurrence, there is a possibility that the live wire end can contact the housing and make it live.

Previous mowers have generally provided a handle mounted directly to the housing; for example, by bolting a bracket directly to the deck of a rotary mower. Thus, if the cord did contact the housing, the user could receive a shock. Isolation of this assembly by inserting insulation between the entire assembly and the deck is apparently effective; however, I have found that this insulation does not remain effective over an extended period of use of the mower. Specifically, it is customary to provide one or more bolts or other connectors which extend from above the bracket to the under surface of the deck or housing. This area, particularly in the case of a rotary mower, is subject to the accumulation of large amounts of grass and other debris. Since few users bother to clean this accumulation out at sufficient intervals, the grass soon forms an electrical bridge across the insulation between the inner end of the connector and the inner surface of the housing. Thus, the insulation is defeated and should the live end of a severed cord come in contact with the housing, the operator can be subjected to a shock.

Figure 2:
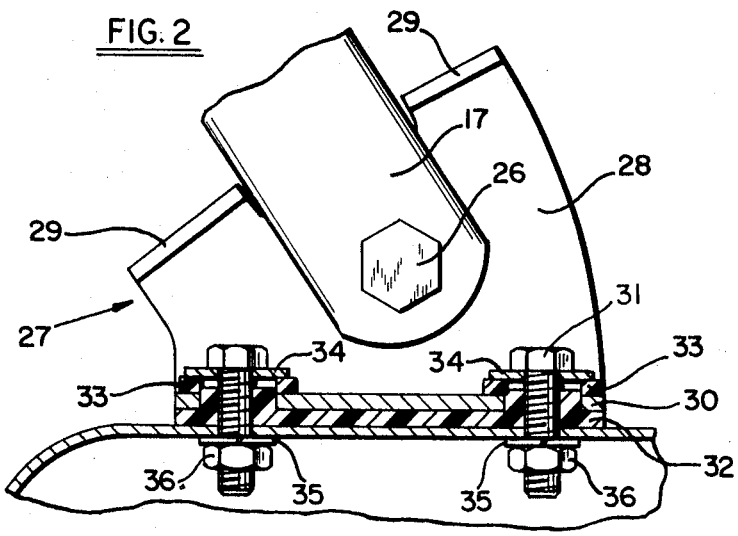
FIG. 2 is a cross-sectional view of the handle mounting shown in FIG. 1.

The present invention reduces the possibility of such shock by providing a novel handle mount, shown generally at 25 in FIG. 1 and in detail in FIG. 2. This assembly includes a clevis pin 26 which carries the handle 17 and is mounted on a bracket 27. The bracket includes an upwardly extending portion 28 with handle stops 29 and a lower portion 30 arranged to be generally parallel to the deck.

In accord with the present invention, the bracket 27 is separated from the deck and from mounting bolts 31 by dielectric bracket insulator 32 and dielectric washers 33. For example, nylon is a suitable dielectric material. The mounting assembly also includes metallic washers 34 and 35 and nuts 36. It can be seen that the deck 12 is directly connected to the mounting bolts 31 but both are electrically insulated from the handle 17 and bracket 27 by insulators disposed above the deck where they are not subject to bridging by the accumulation of grass under the deck.

In this case, if the live wire should become lodged against the housing, the bolts 31 will be live if the housing is; however, the handle and the operator remain isolated by the insulators and there is no danger of shock. It is noted that connecting the bolts 31 to the housing does not introduce a significant hazard since even the most careless operator has no reason to touch the mounting bolts if he runs over the extension cord.

While one specific embodiment of this invention has been illustrated and described, it will be apparent to those skilled in the art that many changes and modifications may be made therefrom without departing from the broader aspects of this invention. Therefore, it is intended that the appended claims cover all such changes and modifications as fall within the true spirit and scope of this invention.

I claim:
1. A lawn mower comprising
   a housing adapted to include an electric motor;
   means supporting said housing for movement over the ground;
   blade means within said housing and arranged to be driven by said motor for cutting grass;
   handle means;
   means connecting said handle means to said housing to provide for operator guidance of said mower; and insulator means between said handle and said housing to isolate said handle electrically from said housing, said insulator means being positioned on an upper surface of said housing to avoid the possibility of bridging by the accumulation of grass on under surfaces of said housing.

2. A lawn mower as claimed in claim 1 wherein
said handle connection means comprises an intermediate bracket secured to said housing; and
said insulator means comprises a layer of dielectric material between said bracket and said housing.

3. A lawn mower as claimed in claim 2 wherein
said bracket is secured to said housing by means extending through openings in said bracket, said dielectric layer and said housing; and
said insulator includes dielectric means between said bracket and said securing means.

4. A lawn mower as claimed in claim 3 wherein said handle is movably attached to said bracket.

5. A lawn mower as claimed in claim 3 wherein
said securing means comprises bolts;
said dielectric means between said bracket and said securing means comprises at least one dielectric washer for each of said bolts; and
said dielectric layer is substantially coextensive with the interface between said bracket and said housing.

6. In a lawn mower including a blade and an electric motor in driving relationship thereto supported within a housing for movement over a lawn, and handle means supported by said housing for guidance of said movement, the improvement comprising
insulator means disposed between said housing and said handle and located on an upper surface of said housing.

7. The combination of claim 6 wherein said mower includes a handle mounting bracket and wherein said insulator means is disposed to isolate said bracket from said housing.

References Cited

UNITED STATES PATENTS 3,028,717  4/1962  West _____ 56—25.4

FOREIGN PATENTS 904,081  8/1962  Great Britain _____ 56—25.4

RUSSELL R. KINSEY, Primary Examiner

U.S. Cl. X.R.

56—13.4, 17.5